June 1, 1926.
B. L. BOWEN
EDUCATIONAL DEVICE
Filed May 24, 1924
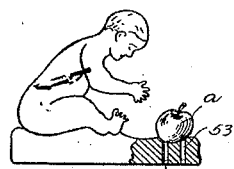    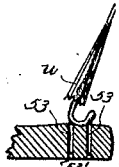
Fig.1.   Fig.2.   Fig.3.   Fig.4.   Fig.5.
 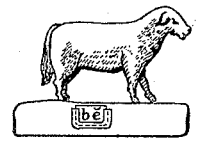 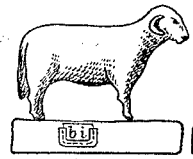 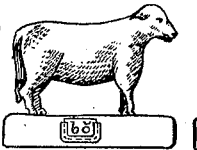 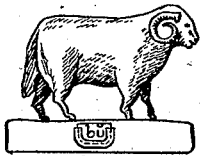
Fig.6.   Fig.7.   Fig.8.   Fig.9.   Fig.10.
    
Fig.11.   Fig.12.   Fig.13.   Fig.14.   Fig.15.
 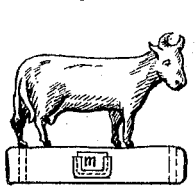 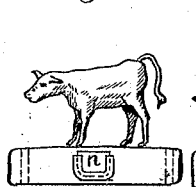 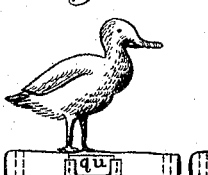 
Fig.16.   Fig.17.   Fig.18.   Fig.19.   Fig.20.
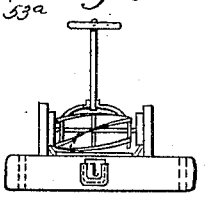 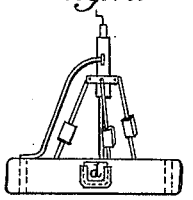 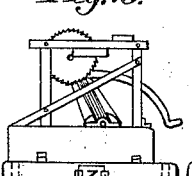  
Fig.21.   Fig.22.   Fig.23.   Fig.24.   Fig.25.
   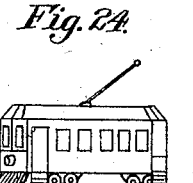 
Fig.26.   Fig.27.   Fig.28.   Fig.29.   Fig.30.
Inventor.
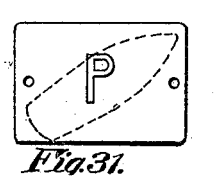 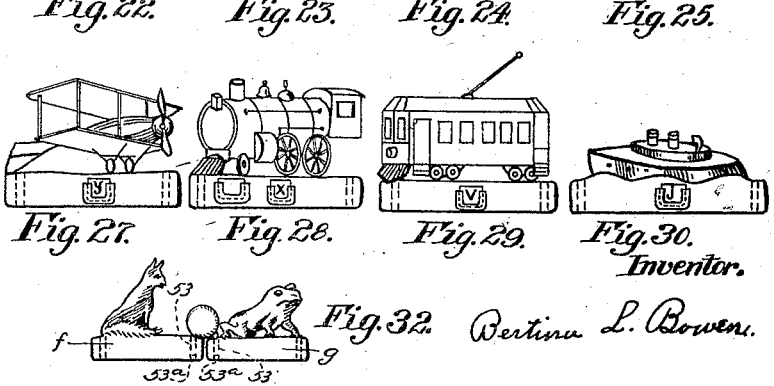
Fig.31.   Fig.32.   Bertina L. Bowen.

Patented June 1, 1926.

1,586,960

UNITED STATES PATENT OFFICE.

BERTINA L. BOWEN, OF HOLLYWOOD, CALIFORNIA.

EDUCATIONAL DEVICE.

Application filed May 24, 1924. Serial No. 715,531.

My present invention relates to educational appliances, and it is an especial object of this invention to provide improved means for use in the beginning of instruction in reading, or in the beginning of phonetic instruction preliminary to reading or writing.

It is an object of this invention to provide a set of movable objects or associations of objects which may be regarded and referred to as phonetic toys, each toy being intrinsically attractive and suitable for use in the play of young children, and each toy being moreover selected with reference to its suitability for association with a particular sound. Each may optionally be provided with a corresponding letter, and it is advantageous that the units referred to be suitable for arrangement in groups representing words. In a preferred embodiment of my invention, the respective objects or associations of objects may be selected with reference to their capability of producing the various sounds or combinations of sounds which are to be associated therewith.

It is well known that, as is briefly but clearly set forth in, for example, a chapter on hieroglyphics in "The Story of Mankind," by Hendrik van Loon (Boni & Liveright), pp. 17-21, the first steps of a phonetic system of writing may naturally utilize representations of objects to signify sounds. It is a purpose of this invention to provide a set or sets of objects capable of easy association with specific vowels or consonants or combinations thereof; and, in a preferred embodiment of my invention, suitable for use in the giving of initial lessons to very young children, such consonants as are to be employed in the mentioned initial lessons may be represented by animals or machines having an intrinsic interest and also capable of uttering or giving rise to sounds similar to those that are to be associated therewith.

Instead of employing exclusively such toys or representations of objects as might adapt the same to a system of pasigraphy, capable of use in any language whatever, I may optionally utilize, to any desired extent, toys comprising the figure of an infant associated with an object whose name he may be assumed to be attempting to pronounce,—a toy representing a baby reaching for an apple being, for example, appropriate for association with the short sound of a; and, in a preferred embodiment of my invention, I may employ, for association with all the ordinary short sounds of the common English vowels, toys representing babies reaching for various familiar objects whose names may begin with the desired short vowel sounds. In order to aid the learner in associating these respective sounds with the letters by which they are ordinarily represented, the respective letters referred to may optionally be permanently or removably be affixed to the corresponding objects, or to bases respectively supporting the same.

The use of pictorial representations to suggest sounds being already familiar in the teaching of reading by a phonetic method (as in the "See and Say Series," published by the Iroquois Publishing Company), it is an object of my present invention to take a step in advance of the pictorial method by providing actual movable units, which a child may at first regard simply as toys, arranging them in any desired relative positions, but which are preferably provided with uniform rectangular bases adapting them to be arranged in linear series, as in the spelling of words; and, in one advantageous embodiment of my invention I may represent the ordinary short vowel sounds by means including separable objects adapted either to be positioned upon bases supporting babies with outstretched arms, or, alternatively, to be positioned upon one or the other of the opposite ends of a base supporting a toy employed to represent a consonantal sound; and the separable objects so employed to represent vowel sounds may optionally be provided with projections adapting them to interfit and link together a plurality of bases of toys assembled in linear series for the representation of a single word or syllable.

Other objects of my invention will appear from the following description and an illustrative embodiment thereof, taken in connection with the appended claims and the accompanying drawings, in which, Figs. 1–30 are elevational or vertical sectional views of separate phonetic toys; Fig. 31 is a bottom view of the toy shown in Fig.

26; and Fig. 32 is a perspective view of an association or assembly of toys such as may be used to spell the word "f-o-g." A vowel object of an alternative form, with connecting projection, is illustrated in this figure.

In Fig. 1 is shown, partly in section, a toy suitable for association with the short sound "ă," this toy being shown as comprising a base, with which the figure of a baby may be integrally connected, and a representation of an apple, the latter being shown as removably mounted, to permit of the substitution of another object as engaging the baby's attention.

In Figs. 2 to 5 inclusive are presented fragmentary sectional views suggesting respectively the substitution of an egg, (for association with the short sound "ĕ,") an image of an Indian (for association with the short sound "ĭ,") an orange (for association with the short sound "ŏ,") and an umbrella (for association with the short sound "ŭ,") each of the objects referred to being adapted for substitution in a base of the character shown in Fig. 1, and in front of its representation of a baby.

In Figs. 6 to 10 inclusive are shown toys representing a family of sheep, the lamb disclosed in Fig. 6 being suitable for association with the sound "bă," the "sister sheep" of Fig. 7 being suitable for association with the sound "bĕ," the "brother" shown in Fig. 8 being suitable for association with the sound "bĭ," the ewe shown in Fig. 9 being suitable for association with the sound "bŏ," and the ram shown in Fig. 10 being suitable for association with the sound "bŭ."

In Figs. 11 to 15 inclusive are shown toys which represent members of the dog family and a bear cub, the bark of the Airedale disclosed in Fig. 11 being suitable for its association with the consonant "b," (as in bowwow), the panting of the dachshund of Fig. 12 being suitable for its association with the aspirating sound of "h," the latration of the intractable fox depicted in Fig. 13 being suitable for its association, perhaps somewhat arbitrarily, with the sound "f," the howling or ululation of the wolf shown in Fig. 14 being suitable for association with the sound of "w," and the threatening growl of the diminutive bear cub of Fig. 15 being suitable for its association with the sound of "r."

A bullfrog, as shown in Fig. 16, may be associated, in consideration of the guttural quality of its "gung," with the letter "g"; the "moo" of the cow of Fig. 17 may suggest "m"; and the "naa" of the calf of Fig. 18 may serve to associate it with "n." The connection of the duck 19 with the sound "qu" and the use of a snake to suggest "s" may be assumed to require no comment.

Somewhat arbitrarily, the continuous whirr of the lawn mower of Fig. 21 may adapt it for association with "l"; the intermittent strokes of a compressed-air drill, as represented in Fig. 22 may be favorable to its association with the "explosive" letter "d"; the "zip" of the saw of Fig. 23 may be favorable to its association with "z"; the ticking of the watch of Fig. 24 may justify its customary association with "t"; and it will not be found difficult to connect the clock of Fig. 25 with the hard sound of "c" (or, later, with "k," or with "ck").

The puffing of the tug shown in Fig. 26 will permit of its association with "p"; the continuous hum of the aeroplane of Fig. 27 may permit of its association with the so-called consonantal sound of "y"; an escape of steam may be regarded as producing a sound favorable to the associating of the locomotive of Fig. 28 with the letter "x"; a moving trolley car, Fig. 29, may be regarded as giving rise continuously to the sound of "v"; and the engine of the motorboat shown in Fig. 30 may be regarded as producing a series of "j's".

My toys are adapted to be set up like type, and each of the mentioned toys, or any preferred equivalent toys, may optionally be adapted to rest either on their bases or on their sides, displaying the under surfaces of their bases; and the under surfaces referred to may optionally be provided, as shown in Fig. 31, corresponding to Fig. 26, with an appropriate letter or letters, the construction here referred to being such that, when the toys of a series are standing on their bases, the mentioned letters may be concealed, although the tilting of the respective toys may be effective to expose the said letters and at the same time throw the respective animals or objects into inconspicuous or concealed positions. At the beginning of study, emphasis may thus be placed upon the connecting of a specific sound with a particular object; and emphasis may subsequently be placed upon the corresponding connection between a specific letter and a particular sound. Instead of, or in addition to, characters on the lower sides of the respective toys, I may provide on each, as shown, a pocket or other means for the removable retention of a card, or the like, on which may be displayed the letter or letters to be associated therewith. As may be deemed best, a plurality of pockets may be provided, as shown, for example, in Fig. 25,—the pockets shown on the clock toy exhibited in this figure being respectively intended to receive cards marked, "c," "k," and "ck." The fact that these characters may have equivalent phonetic value is thus conveniently emphasized.

The foregoing examples will suffice to indicate that, although a single toy may ordinarily represent a single sound or a single letter, one toy may optionally be employed to represent a combination of sounds or letters, alternative combinations may be employed to represent the same sound or combination of sounds, and the selection of a particular toy to be associated with a particular sound may be made either upon an arbitrary or an onomatopoetic basis. In general, word-building exercises are believed to be so familiar to teachers as to require no specific rescription here; but my set of toys makes it possible to begin such exercises at an earlier date and to progress therein more rapidly and more pleasurably than heretofore.

Any suitable material (such as a rubber composition, or sheet-metal, or celluloid) may be employed in the construction of my novel phonetic toys; and I may either form the respective units entirely integral and separate or I may adapt some or all of them to permit substitutions and linkages in, for example, the general manner suggested in Figs. 1–5 inclusive and in Fig. 32. That is to say, the base 50 of a toy such as is shown in Fig. 1 may be integral with the image of a baby, 51, shown as reaching and leaning toward an object in front of it; and the said object, shown as an apple, 52, may be provided with one or more projections 53, suitable to enter an opening or openings, 53′, for its removable retention in such manner as to permit of the ready substitution of the egg e of Fig. 2, the Indian i of Fig. 3, the orange o of Fig. 4, the umbrella u of Fig. 5, or any other object provided with similar projections and suitable for association with a particular vowel or other sound,—it being understood that all of my described toys are cited merely as examples. It will be obvious that, if desired, as soon as the intended sounds and letters are successfully connected with vowel objects such as are shown in Figs. 2–5 inclusive, these objects may optionally be used as linking elements in the building of words, in the general manner suggested in Fig. 32,—wherein the word "f-o-g" is spelled by means of a fox toy f (standing for "f"), an orange toy o (standing for short "o"), and a frog toy g (standing for "g"). It will be obvious that, although any desired alternative means may be employed for the representation or suggestion of vowel sounds, additional objects may be provided at will for use in addition to or in place of the vowel objects above suggested as suitable for association with the familiar short sounds of single vowels. To permit the use of vowel objects in the manner suggested in Fig. 32, or before or after any desired toy representing a consonant, each vowel object may optionally be provided with a substantially parallel pair of the pins or projections 53; and openings 53ª, adapted to receive the same, may be provided in the ends of the bases of any or all of the toys with which said vowel objects may, in word-building play or lessons, be connected.

It is regarded as a great and conclusive merit of the system of instruction to which my toys are adapted that said toys may make the initial steps of learning to read both rational and pleasant, as well as constructive in character.

Although I have herein described an advantageous embodiment of my invention with sufficient completeness to enable the same to be understood and employed in the instruction of beginners, it will be understood that my invention is in no sense limited to the particular toys or features of construction above-mentioned for purposes of illustration, the actual scope of my invention being indicated in the following claims.

What I claim is:

1. In means for the teaching of reading, a font of movable phonetic toys comprising representations of objects respectively suitable for onomatopoetic association with different single sounds, said toys initially displaying no letters when disposed upright but being respectively provided with means for optionally displaying a letter or combination of letters by which said sounds may be represented.

2. In means for the teaching of reading by movable phonetic toys: a font of movable phonetic toys comprising vowel objects provided with means for removably securing the same to bases.

3. In means for the teaching of reading, a font of movable phonetic toys including vowel toys each comprising a base supporting a vowel image of a baby reaching for an object whose name begins with a vowel.

4. In vowel toys of the character referred to in claim 3, vowel objects separable from said bases.

5. In vowel toys of the character referred to in claim 3, vowel objects adapted to serve to link toys representing consonants in the formation of words.

6. Educational toys comprising bases, representations of objects suitable for onomatopoetic association with specific sounds, and means for removably securing corresponding separate letters thereon.

7. An educational device comprising a font of three-dimensional image-toys onomatopoetically suggestive of different sounds and adapted to be set up like type to form words without concurrent display of letters, on normally invisible surfaces of said toys.

8. Means for a kind of phonetic instruction beginning in play and including the formation of word symbols, initially assembled without display of alphabetic characters, said means comprising: a font of movable, three-dimensional image toys, each toy bing adapted to be onomatopoetically associated uniformly with the same selected single sound or syllable, and adapted also to be subsequently associated with the corresponding alphabetic character or characters, each sound or syllable being always represented by a like toy and each toy being provided with means permitting a delayed display of a letter not initially visible.

BERTINA L. BOWEN.